US009348353B2

(12) United States Patent
Hsiao et al.

(10) Patent No.: US 9,348,353 B2
(45) Date of Patent: May 24, 2016

(54) POWER CONVERSION APPARATUS AND CONTROLLING METHOD THEREOF

(71) Applicant: DELTA ELECTRONICS, INC, Taoyuan Hsien (TW)

(72) Inventors: Chih-Hung Hsiao, Taoyuan Hsien (TW); Cheng-Chieh Chan, Taoyuan Hsien (TW); Jo-Fang Wei, Taoyuan Hsien (TW); Yun-Chi Hung, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 585 days.

(21) Appl. No.: 13/729,651

(22) Filed: Dec. 28, 2012

(65) Prior Publication Data

US 2014/0015506 A1 Jan. 16, 2014

(30) Foreign Application Priority Data

Jul. 12, 2012 (TW) .............................. 101125018 A

(51) Int. Cl.
*H02M 7/219* (2006.01)
*G05F 5/00* (2006.01)
*H02M 5/458* (2006.01)

(52) U.S. Cl.
CPC ................. *G05F 5/00* (2013.01); *H02M 7/219* (2013.01); *H02M 5/4585* (2013.01)

(58) Field of Classification Search
CPC ................... H02M 5/4585; H02M 2007/2195; H02M 7/219; H02M 7/797; Y02E 10/76; Y02E 10/763
See application file for complete search history.

(56) References Cited

U.S. PATENT DOCUMENTS

| 6,850,426 | B2 | 2/2005 | Kojori et al. | |
| 2009/0160408 | A1 | 6/2009 | Suzuki et al. | |
| 2010/0213769 | A1* | 8/2010 | Sakakibara | 307/82 |
| 2010/0308892 | A1* | 12/2010 | Sakakibara | 327/482 |
| 2011/0199801 | A1* | 8/2011 | Grbovic | H02P 27/06 363/131 |
| 2012/0163045 | A1* | 6/2012 | Fujita et al. | 363/37 |

* cited by examiner

*Primary Examiner* — Harry Behm
(74) *Attorney, Agent, or Firm* — Muncy, Geissler, Olds & Lowe, P.C.

(57) ABSTRACT

A power conversion apparatus and a controlling method thereof are disclosed. The power conversion apparatus is applied with a power generation apparatus, which outputs a first signal. The power conversion apparatus includes a conversion-sensing circuit, a control signal generating circuit and a switching circuit. The conversion-sensing circuit converts the first signal into a second signal, and senses at least a voltage waveform change of the second signal to generate a time interval. The control signal generating circuit is electrically connected with the conversion-sensing circuit and outputs a control signal according to the time interval. The switching circuit is electrically connected with the power generation apparatus and the control signal generating circuit, and has a plurality switching elements. The switching circuit receives the first signal and conducts one of the switching elements according to the control signal so as to convert the first signal and output an output signal.

9 Claims, 13 Drawing Sheets

POWER CONVERSION APPARATUS AND CONTROLLING METHOD THEREOF

CROSS REFERENCE TO RELATED APPLICATIONS

This Non-provisional application claims priority under 35 U.S.C. §119(a) on Patent Application No(s). 101125018 filed in Taiwan, Republic of China on Jul. 12, 2012, the entire contents of which are hereby incorporated by reference.

BACKGROUND OF THE INVENTION

1. Field of Invention

The invention relates to a conversion apparatus and a controlling method thereof, and in particular, to a power conversion apparatus and a controlling method thereof.

2. Related Art

Recently, due to the rise of the environmental awareness and the gradual depletion of the fossil energy (e.g., petroleum and coal), countries around the world become aware of the importance of the development of the new type energy. The wind power is the inexhaustible energy without the doubt of energy depletion and can also avoid the problem of the energy monopoly. Thus, the countries around the world also actively develop the wind power generation system to expect to reduce the dependence on the fossil energy by increasing the utilization of the wind power.

The wind power generation system needs to convert the electric power, generated from the wind power generator (hereinafter referred to as a wind generator) via an electric power conversion apparatus. In addition to saving or supplying the converted electric power to the load, the converted electric power may also be connected to the power supply grid in parallel. The architectures of the conventional electric power conversion apparatus may be substantially classified into a passive architecture and an active architecture.

In the passive architecture, a passive full-bridge rectifier converts the three-phase power, outputted from the wind generator, into the single-phase power, and then achieves the objects of energy conversion through the operations of an inductor and a switch. Because the use of only a single switch can achieve the energy conversion, the energy loss of the apparatus is extremely small. When being applied to the low wind speed or the low power wind generator, the conversion efficiency of the apparatus is relatively high. However, the passive architecture cannot actively control and adjust the power factor, and the loss thereof also proportionally rises with the increases of the power and the current. When being applied to the middle or high wind speed or the high power wind generator, the power loss of the apparatus upon conversion is relatively high.

In the active architecture, six active switches and three inductors are utilized, and the instantaneous rotating speed is obtained through a rotor position detector (e.g., an encoder) disposed on the generator to control the instantaneous rotating speed, so that the power conversion apparatus can complete the electric power conversion. Because the active architecture can be synchronously changed with the change of the three-phase AC power outputted form the wind generator and can achieve the full power energy conversion, the conversion efficiency thereof is relatively high and the energy loss thereof is relatively low when being applied to the high wind speed or the high power wind generator. However, the active architecture needs to drive six active switches to operate concurrently and needs to supply the power to the position detector disposed on the generator to have the long distance line loss, so that the power loss is much larger than that of the passive system. Thus, the active architecture is not advantageous to the wind energy conversion for the low wind speed or the low power wind generator.

Therefore, it is an important subject to provide a power conversion apparatus, having full power and high efficiency energy conversion and lower power loss, and a controlling method thereof.

SUMMARY OF THE INVENTION

In view of the foregoing subject, an objective of the invention is to provide a power conversion apparatus, having full power and high efficiency energy conversion and lower power loss, and a controlling method thereof.

To achieve the above objective, the present invention discloses a power conversion apparatus applied with a power generation apparatus, which outputs a first signal. The power conversion apparatus includes a conversion-sensing circuit, a control signal generating circuit, and a switching circuit. The conversion-sensing circuit converts the first signal into a second signal and senses at least one voltage waveform change of the second signal to generate a time interval. The control signal generating circuit is electrically connected with the conversion-sensing circuit and outputs a control signal according to the time interval. The switching circuit is electrically connected with the power generation apparatus and the control signal generating circuit, and has a plurality of switching elements. The switching circuit receives the first signal and turns on one of the switching elements according to the control signal so as to convert the first signal and output an output signal. In addition, the conversion-sensing circuit includes a Schmitt trigger or any other waveform shaping circuit. The time interval is equal to one third of a time difference between a rising edge and a falling edge of a voltage waveform of the second signal; otherwise, the time interval is equal to a time difference between a rising edge of one of the voltage waveforms of the second signal and a falling edge of the other of the voltage waveforms of the second signal.

In addition, the control signal generating circuit obtains a frequency of the first signal according to the time interval. Besides, the control signal generating circuit controls the switching circuit according to information of a corresponding voltage peak value of the first signal during a certain interval. Otherwise, the control signal generating circuit controls the switching circuit by way of space vector pulse width modulation.

The power conversion apparatus further includes a first energy storage unit and a second energy storage unit. The first energy storage unit is electrically connected with the power generation apparatus and the switching circuit. The first energy storage unit stores and releases electric power generated by the power generation apparatus according to turn-on and turn-off of the switching elements, respectively. The second energy storage unit is electrically connected with the switching circuit and stores electric power of the output signal.

The power conversion apparatus further includes a brake energy recovery circuit electrically connected with the switching circuit. The brake energy recovery circuit has a switch unit, a first energy storage element and a second energy storage element. The switch unit is electrically connected with a first terminal of the first energy storage element, and a second terminal of the first energy storage element is electrically connected with a first terminal of the second energy storage element. In addition, the switch unit has a first switch element electrically connected with the first terminal of the first energy storage element. The first energy storage element stores braking energy of the power generation apparatus when the first switch element turns on, and the second energy storage element stores energy released from the first energy storage element when the first switch element turns off. The switch unit further has a second switch element electrically connected with a first terminal of the first switch element and the first terminal of the first energy storage element. The first energy storage element stores energy released from the second energy storage element when the second switch element turns on, and the first energy storage element releases the stored energy to the power generation apparatus when the second switch element turns off.

To achieve the above objective, the present invention further discloses a controlling method applied with a power conversion apparatus. The power conversion apparatus comprises a conversion-sensing circuit, a control signal generating circuit and a switching circuit. A power generation apparatus outputs a first signal inputted to the power conversion apparatus. The controlling method comprising: sensing the first signal and converting the first signal into a second signal via the conversion-sensing circuit; sensing at least one voltage waveform change of the second signal and generating a time interval via the conversion-sensing circuit; outputting a control signal via the control signal generating circuit and according to the time interval; and turning on one of a plurality of switching elements of the switching circuit via the switching circuit and according to the control signal, and converting the first signal into an output signal and outputting the output signal. Herein, the time interval is equal to one third of a time difference between a rising edge and a falling edge of a voltage waveform of the second signal; otherwise, the time interval is equal to a time difference between a rising edge of one of the voltage waveforms of the second signal and a falling edge of the other of the voltage waveforms of the second signal.

In addition, the control signal generating circuit obtains a frequency of the first signal according to the time interval. Besides, the control signal generating circuit controls the switching circuit according to information of a corresponding voltage peak value of the first signal during a certain interval.

The power conversion apparatus further includes a brake energy recovery circuit electrically connected with the switching circuit. The brake energy recovery circuit has a switch unit, a first energy storage element and a second energy storage element.

The first energy storage element stores braking energy of the power generation apparatus when a first switch element of the switch unit turns on, and the second energy storage element stores energy released from the first energy storage element when the first switch element turns off.

In addition, the first energy storage element stores energy released from the second energy storage element when a second switch element of the switch unit turns on, and the first energy storage element releases the stored energy to the power generation apparatus when the second switch element turns off.

To achieve the above objective, the present invention further discloses a power conversion apparatus including a control signal generating circuit and a brake energy recovery circuit. The control signal generating circuit is electrically connected with the power generation apparatus and outputs a control signal according to a first signal generated by the power generation apparatus. The brake energy recovery circuit is electrically connected with the power generation apparatus and the control signal generating circuit. The control signal controls the brake energy recovery circuit to store energy generated when the power generation apparatus brakes, and controls the brake energy recovery circuit to release the stored electric power to the power generation apparatus.

As mentioned above, the power conversion apparatus of the invention utilizes the conversion-sensing circuit to convert the first signal into the second signal and to sense at least one voltage waveform change of the second signal to generate the time interval, so as to obtain the instantaneous rotating speed and the frequency of the power generation apparatus and achieve the control of the instantaneous rotating speed. Thus, the prior art position detector can be replaced, and it is unnecessary to provide the power for the position detector so that no long distance line loss occurs. In addition, the control signal generating circuit of the invention outputs the control signal according to the time interval so as to control one of the switching elements of the switching circuit to turn on and off, and the first signal is converted and outputted. Because only the switch operation of one switching element is switched in one duration, the power consumption of the switching element can be decreased, the current harmonic wave of the output signal can be minimized, and the power conversion apparatus has the full power and high efficiency energy conversion.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
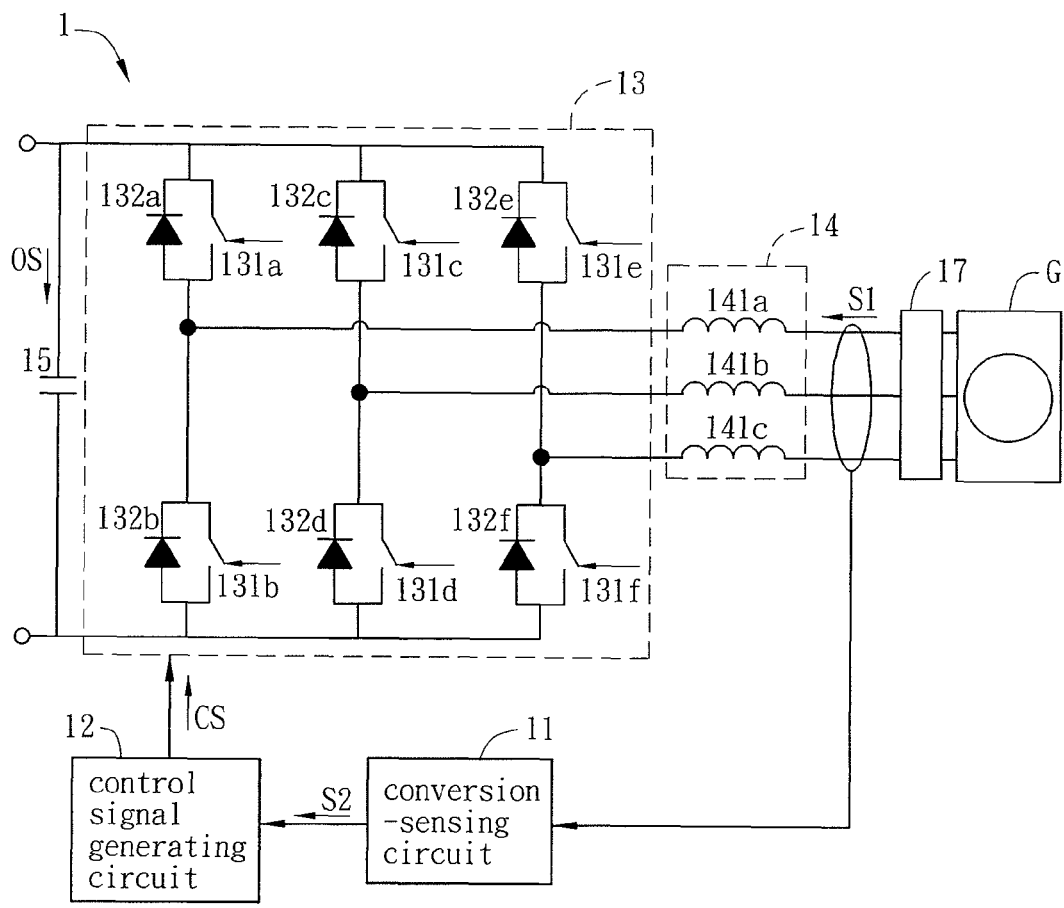
FIG. 1 is a schematic illustration showing a power conversion apparatus according to a preferred embodiment of the invention.

FIG. 1 is a schematic illustration showing a power conversion apparatus 1 according to a preferred embodiment of the invention. Referring to FIG. 1, a power conversion apparatus 1 may be applied with a power generation apparatus G. The power generation apparatus G may output a first signal S1, which is a three-phases balanced sine wave voltage signal with the stable phase sequence. The power generation apparatus G may be, for example but without limitation to, a wind power generator of a wind power generation system, and may also be another power generation apparatus, such as a thermal power generation apparatus, a waterpower power generation apparatus, a solar power generation apparatus or any other power generation apparatus. In addition, the output, after the conversion of the power conversion apparatus 1, can charge the battery module for storage, and may also be supplied to the load or may be connected to the power supply grid in parallel. However, the invention is not particularly restricted thereto.

The power conversion apparatus 1 includes a conversion-sensing circuit 11, a control signal generating circuit 12 and a switching circuit 13. In addition, the power conversion apparatus 1 may further include a first energy storage unit 14 and a second energy storage unit 15.

Figure 2A:
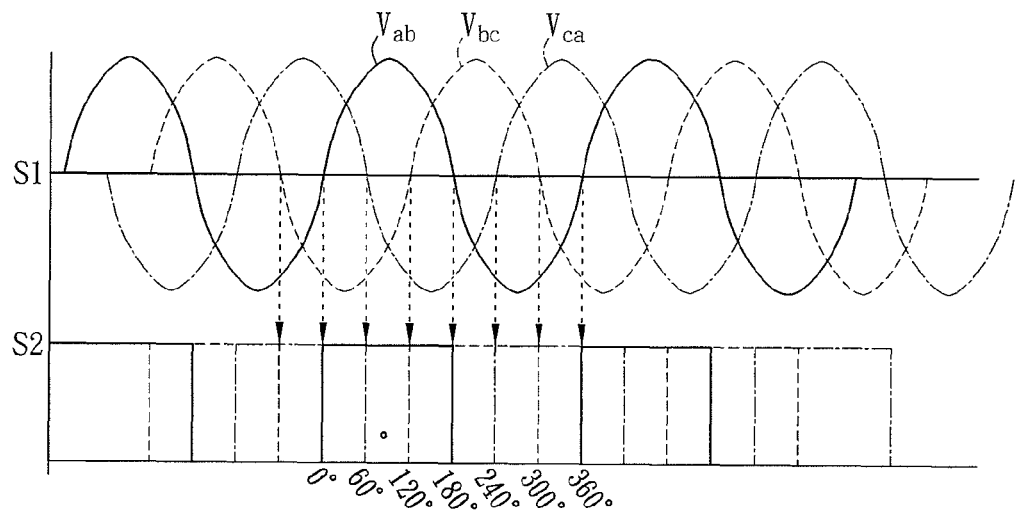
FIGS. 2A and 2B are schematic illustrations showing waveforms of three-phase line voltages of a first signal and a second signal of the power conversion apparatus, respectively.
Figure 2B:
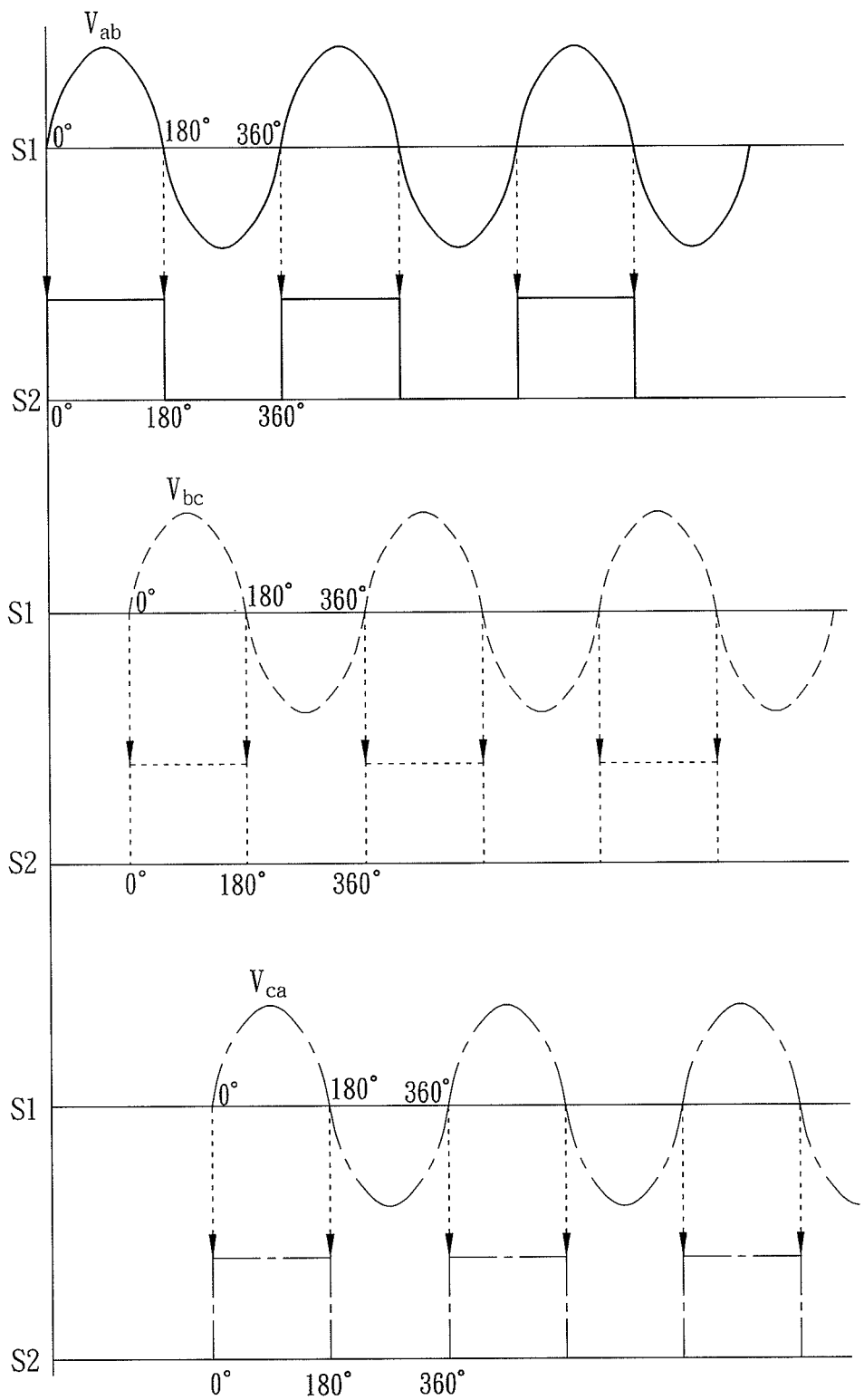

The conversion-sensing circuit 11 can sense the first signal S1, and convert the first signal S1 into a second signal S2. Please refer to FIGS. 1, 2A and 2B, wherein FIGS. 2A and 2B are schematic illustrations showing waveforms of three-phase line voltages of the first signal S1 and the second signal S2 of the power conversion apparatus, respectively.

The first signal S1 is a three-phase balanced sine wave voltage signal with the stable phase sequence. So, it is possible to sense the first signal S1 via, for example, a potential transformer (PT, not shown), and to utilize the conversion-sensing circuit 11 to convert the first signal S1 into the second signal S2. The conversion-sensing circuit 11 may include a Schmitt trigger or any other waveform shaping circuit. In this embodiment, the Schmitt trigger functions as the waveform shaping circuit, and can, for example, convert the voltage transition points of the three-phase sine wave first signal S1 (line voltages $V_{ab}$, $V_{bc}$ and $V_{ca}$) of FIG. 2A into the square wave signals (i.e., the second signal S2) with the rising and falling edges, respectively. As shown in FIG. 2B, taking the line voltage $V_{ab}$ as an example, the sine wave changes from the negative polarity to the positive polarity at 0°, so that a rising edge of the second signal S2 can be obtained. In addition, the sine wave changes from the positive polarity to the negative polarity at 180°, so that a falling edge of the second signal S2 is obtained, and so on. Therefore, as shown in FIG. 2B, the line voltages $V_{ab}$, $V_{bc}$ and $V_{ca}$ of the first signal S1 may be respectively converted into the square waves of the second signal S2, and the three square waves of the second signal S2 correspond to the line voltages $V_{ab}$, $V_{bc}$ and $V_{ca}$ of the first signal S1.

In addition, the conversion-sensing circuit 11 can sense at least one voltage waveform change of the second signal S2 to generate a time interval. Herein, the time interval is, for example, equal to one third of a time difference between a rising edge and a falling edge of a certain line voltage waveform of the second signal S2. Specifically, taking the line voltage $V_{ab}$ of the first signal S1 of FIG. 2B as an example, the time difference between the rising edge and the falling edge of the line voltage waveform of the second signal S2 is the time required for the waveform of the line voltage $V_{ab}$ to change from 0° to 180° (i.e., a half period of the line voltage $V_{ab}$), so one time interval is equal to the time required for the phase of the first signal S1 to change 60° (180/3).

In addition, in another implemented example, the time interval may also be equal to the time difference between the rising edge of one voltage waveform of the second signal S2 and the falling edge of the other voltage waveform of the second signal S2. Herein, as shown in FIG. 2A, the time difference between the rising edge of one line voltage waveform of the second signal S2 and the falling edge of the other line voltage waveform of the second signal S2 is also the time required for the waveform of the first signal S1 to change 60°.

After the time interval is obtained, the control signal generating circuit 12 can calculate to obtain the period of the first signal S1 (the period is equal to 6 times of the time interval) and the frequency (the frequency is equal to 1/period) according to the time interval so as to obtain the instantaneous rotating speed and the frequency of the power generation apparatus G. Thus, the power conversion apparatus 1 can achieve the control of the instantaneous rotating speed. Not only the prior art position detector (the price of the position detector is high) is needed, but the power of the position detector needs not to be provided and, the long distance line loss is eliminated. More specifically, the invention does not intend to restrict the time interval to the time for the first signal S1 to change 60°. In other aspects, the time interval may also be the time required for the change of 30° or any other angle. Alternatively, utilizing the first signal S1 to perform the mathematical calculation can also obtain the instantaneous rotating speed and the frequency of the power generation apparatus G.

With reference to FIG. 1, the control signal generating circuit 12 is electrically connected with the conversion-sensing circuit 11 and can output a control signal CS according to the time interval. The control signal CS is a pulse width modulation (PWM) signal and can include the information of the instantaneous rotating speed and the frequency of the power generation apparatus G. The control signal generating circuit 12 can output the control signal CS to control the switching circuit 13 according to the information of a corresponding voltage peak value of the first signal S1 during a certain interval. The control signal generating circuit 12 can control the switching circuit 13 via the space vector pulse width modulation (SVPWM) or the sinusoidal pulse width modulation (SPWM).

The switching circuit 13 is electrically connected with the power generation apparatus G and the control signal generating circuit 12. In addition, the switching circuit 13 may also be electrically connected with the first energy storage unit 14 and the second energy storage unit 15. The switching circuit 13 has a plurality of switching elements 131a to 131f and a plurality of diodes 132a to 132f. The diodes 132a to 132f are disposed respectively corresponding to the switching elements 131a to 131f. Herein, the switching elements 131a to 131f may be power transistors, respectively, and the six diodes 132a to 132f are connected in parallel to the six switching elements 131a to 131f in one-to-one manners, respectively. In addition, the switching circuit 13 can receive the first signal S1 and can turn on one of the switching elements 131a to 131f according to the control signal CS so as to convert the first signal S1 and output an output signal OS.

As shown in FIG. 1, the first energy storage unit 14 is electrically connected with the power generation apparatus G and the switching circuit 13, and can turn on and off according to the switching elements 131a to 131f to store and release the electric power of the first signal S1, respectively. Herein, the first energy storage unit 14 has, from top to bottom, three inductors 141a, 141b and 141c, which are electrically connected with the three-phase circuit at the output of the power generation apparatus G and the switching circuit 13. The inductor 141a is electrically connected with the switching elements 131a and 131b and the diodes 132a and 132b, the inductor 141b is electrically connected with the switching elements 131c and 131d and the diodes 132c and 132d, and the inductor 141c is electrically connected with the switching elements 131e and 131f and the diodes 132e and 132f. In addition, the second energy storage unit 15 is electrically connected with the switching circuit 13 and can store the electric power outputted from the power conversion apparatus 1. Herein, the second energy storage unit 15 is a capacitor capable of storing the electric power of the output signal OS. Of course, in other aspects, the output signal OS outputted from the switching circuit 13 may also be supplied to other load apparatuses, or may be used in other applications. In addition, the power conversion apparatus 1 may further include a filter unit 17, which is disposed between the first energy storage unit 14 and the power generation apparatus G and electrically connected with the first energy storage unit 14 and the power generation apparatus G. The filter unit 17 may include three capacitors electrically connected between the first energy storage unit 14 and the power generation apparatus G in a Y-shape connection manner. The filter unit 17 can filter out the noise to stabilize the voltage signals inputted to and outputted from the power generation apparatus G.

Hereinbelow, illustrations will be made with reference to the associated drawings to describe how the control signal CS controls one of the switching elements 131a to 131f so as to convert the first signal S1 and generate the output signal OS to make the power conversion apparatus 1 have the high conversion efficiency.

Please refer to FIGS. 3A to 8C, which are schematic illustrations showing waveforms of the first signal S1 of the power conversion apparatus 1 of the invention and operations of different switching elements, respectively. It is to be firstly specified that some elements are not shown in FIGS. 3A to 8C. For example, the power generation apparatus G, the conversion-sensing circuit 11, the control signal generating circuit 12 and the inductor 141a of the first energy storage unit 14 are not shown in FIGS. 3B and 3C. In addition, the switching elements 131a and 131b and 131d to 131f, which do not operate, are not shown, either. In addition, no filter unit 17 is shown in FIGS. 3A to 8C.

Figure 3A:
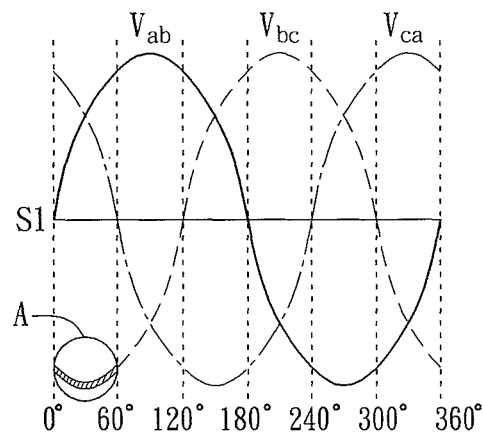
FIGS. 3A to 3C, 4A to 4C, 5A to 5C, 6A to 6C, 7A to 7C, and 8A to 8C are schematic illustrations showing waveforms of the first signal of the power conversion apparatus of the invention and operations of different switching elements, respectively.
Figure 3B:
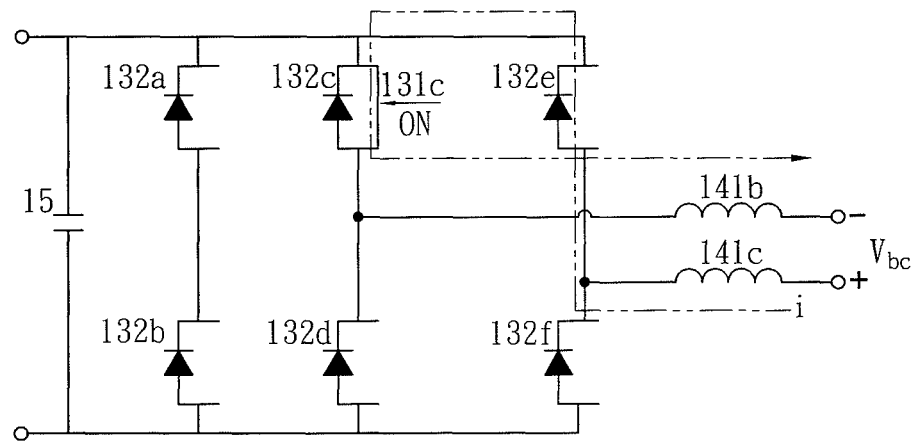

As shown in FIGS. 3A and 3B of this embodiment, when the first signal S1 is in the duration from 0° to 60°, the line voltage $V_{bc}$ has the voltage peak value (as shown in the zone A) higher than the line voltage $V_{ab}$ and the line voltage $V_{ca}$. The control signal generating circuit 12 can output the control signal CS when the line voltage $V_{bc}$ has the peak value and when the first signal S1 is in the duration from 0° to 60°, so as to control the switching element 131c to switch and make the power conversion apparatus 1 have the high conversion efficiency.

Figure 3C:
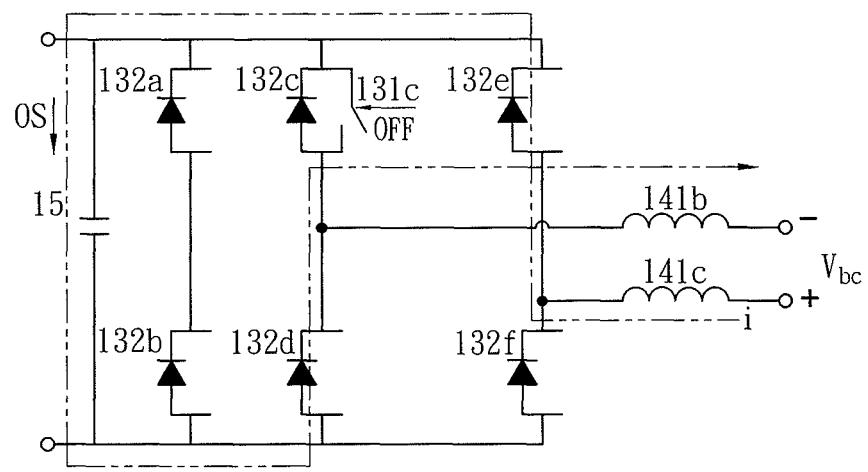

As shown in FIG. 3B, the control signal CS (not shown) only turns on the switching element 131c and generates the loop of the current i via the inductor 141c, the diode 132e, the switching element 131c and the inductor 141b according to the line voltage $V_{bc}$, so that the inductors 141b and 141c can store the electric power of the line voltage $V_{bc}$. In addition, as shown in FIG. 3C, the control signal CS (not shown) is again utilized to control the switching element 131c to turn off, the electric power stored in the inductors 141b and 141c can be converted and outputted to the second energy storage unit 15 for storage through the loop of the current i via the inductor 141c, the diode 132e, the diode 132d and the inductor 141b.

Figure 4A:
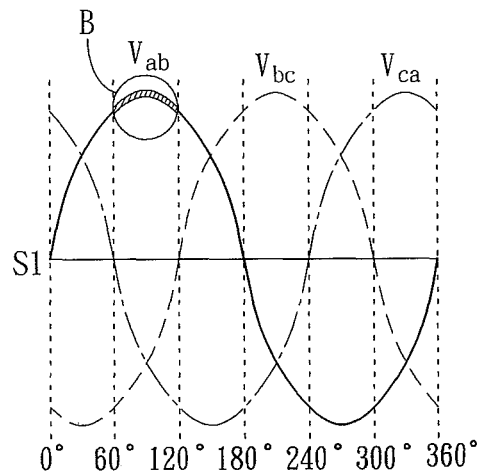
Figure 4B:
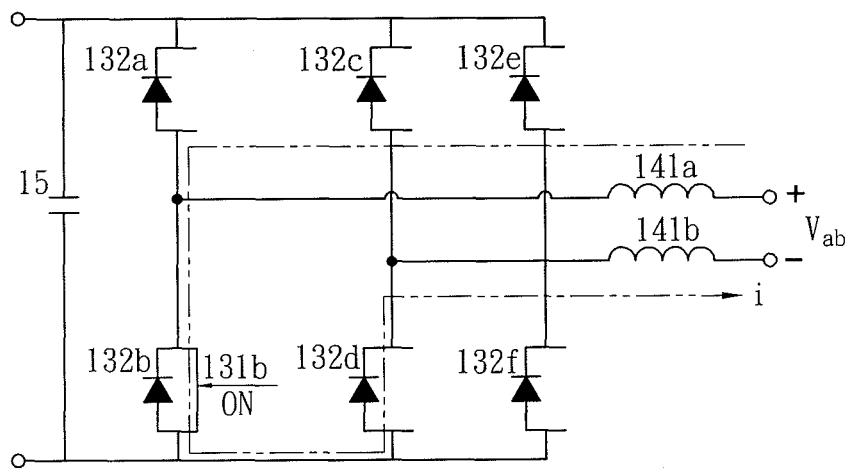

In addition, as shown in FIGS. 4A and 4B of this embodiment, when the first signal S1 is in the duration from 60° to 120°, the line voltage $V_{ab}$ has the voltage peak value (as shown in the zone B) higher than the line voltage $V_{bc}$ and the line voltage $V_{ca}$. The control signal generating circuit 12 can output the control signal CS when the line voltage $V_{ab}$ has the peak value and when the first signal S1 is in the duration from 60° to 120°, so as to control the switching element 131b to switch and make the power conversion apparatus 1 have the high conversion efficiency.

Figure 4C:
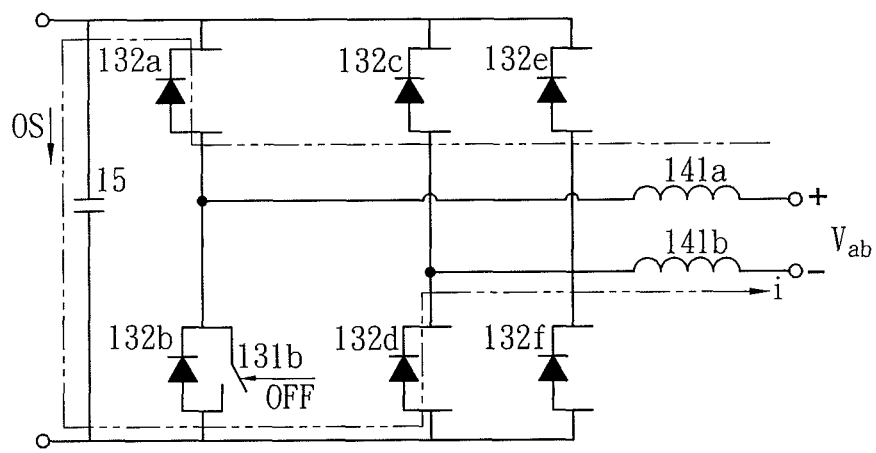

As shown in FIG. 4B, the control signal CS (not shown) only turns on the switching element 131b and generates the loop of the current i via the inductor 141a, the switching element 131b, the diode 132d and the inductor 141b according to the line voltage $V_{ab}$, so that the inductors 141a and 141b can store the electric power of the line voltage $V_{ab}$. In addition, as shown in FIG. 4C, the control signal CS (not shown) is again utilized to control the switching element 131b to turn off and the electric power stored in the inductors 141a and 141b can be converted and outputted to the second energy storage unit 15 for storage through the loop of the current i via the inductor 141a, the diode 132a, the diode 132d and the inductor 141b.

Figure 5A:
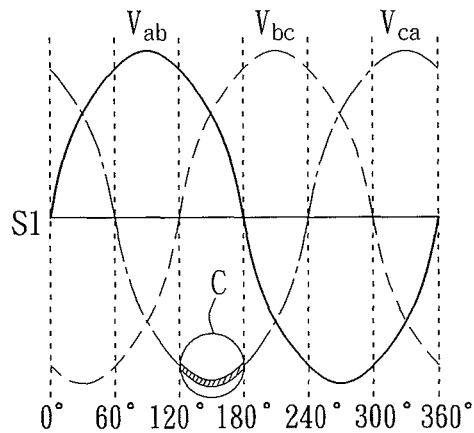
Figure 5B:
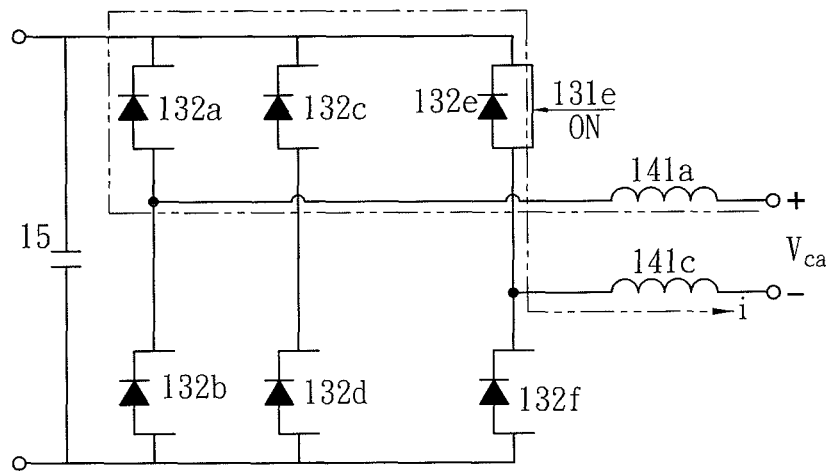

In addition, as shown in FIGS. 5A and 5B of this embodiment, when the first signal S1 is in the duration from 120° to 180°, the line voltage $V_{ca}$ has the voltage peak value (as shown in the zone C) higher than the line voltage $V_{bc}$ and the line voltage $V_{ab}$. The control signal generating circuit 12 can output the control signal CS when the line voltage $V_{ca}$ has the peak value and when the first signal S1 is in the duration from 120° to 180°, so as to control the switching element 131e to switch and make the power conversion apparatus 1 have the high conversion efficiency.

Figure 5C:
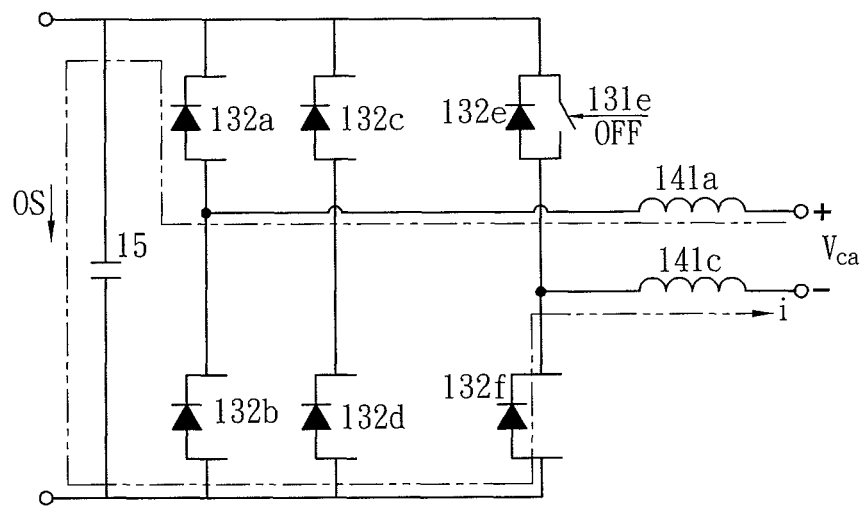

As shown in FIG. 5B, the control signal CS (not shown) only turns on the switching element 131e and generates the loop of the current i via the inductor 141a, the diode 132a, the switching element 131e and the inductor 141c according to the line voltage $V_{ca}$, so that the inductors 141a and 141c can store the electric power of the line voltage $V_{ca}$. In addition, as shown in FIG. 5C, the control signal CS (not shown) is again utilized to control the switching element 131e to turn off, and the electric power stored in the inductors 141a and 141c can be converted and outputted to the second energy storage unit 15 for storage through the loop of the current i via the inductor 141a, the diode 132a, the diode 132f and the inductor 141c.

Figure 6A:
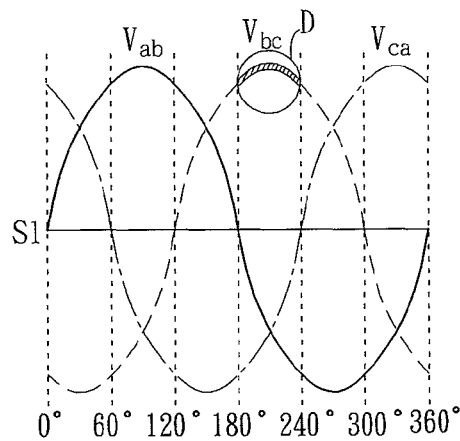
Figure 6B:
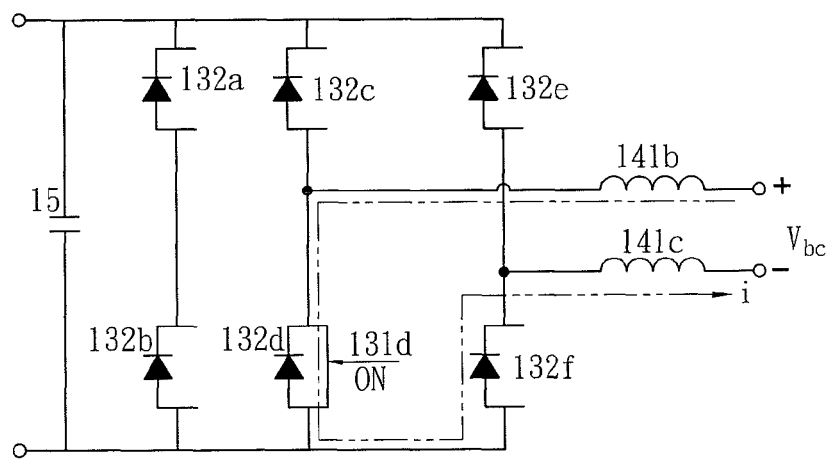

In addition, as shown in FIGS. 6A and 6B of this embodiment, when the first signal S1 is in the duration from 180° to 240°, the line voltage $V_{bc}$ has the voltage peak value (as shown in the zone D) higher than the line voltage $V_{ab}$ and the line voltage $V_{ca}$. The control signal generating circuit 12 can output the control signal CS when the line voltage $V_{bc}$ has the peak value and when the first signal S1 is in the duration from 180° to 240°, so as to control the switching element 131d to switch and make the power conversion apparatus 1 have the high conversion efficiency.

Figure 6C:
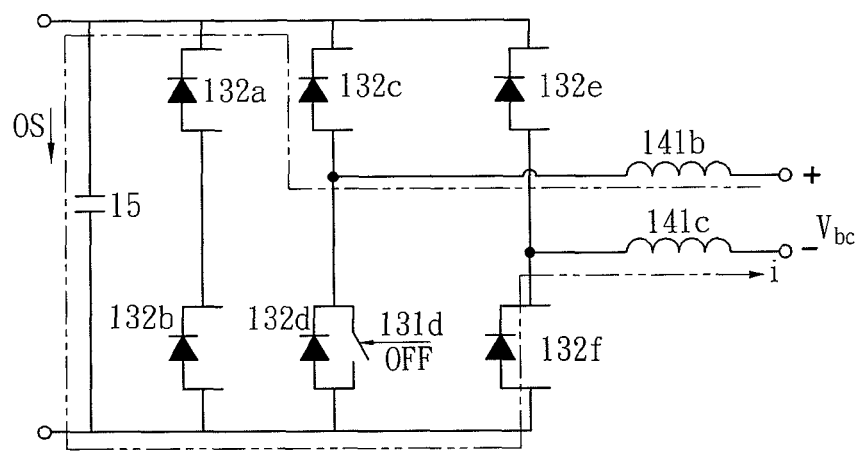

As shown in FIG. 6B, the control signal CS (not shown) only turns on the switching element 131d and generates the loop of the current i via the inductor 141b, the switching element 131d, the diode 132f and the inductor 141c according to the line voltage $V_{bc}$, so that the inductors 141b and 141c can store the electric power of the line voltage $V_{bc}$. In addition, as shown in FIG. 6C, the control signal CS (not shown) is again utilized to control the switching element 131d to turn off and the electric power stored in the inductors 141b and 141c can be converted and outputted to the second energy storage unit 15 for storage through the loop of the current i via the inductor 141b, the diode 132c, the diode 132f and the inductor 141c.

Figure 7A:
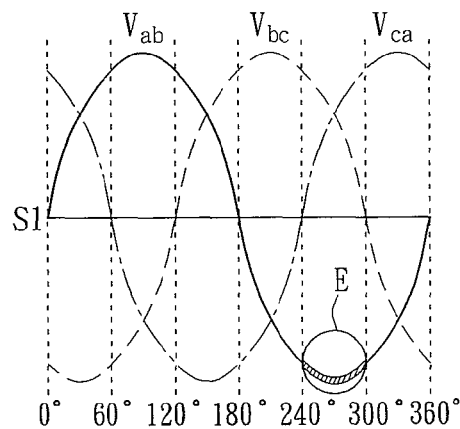
Figure 7B:
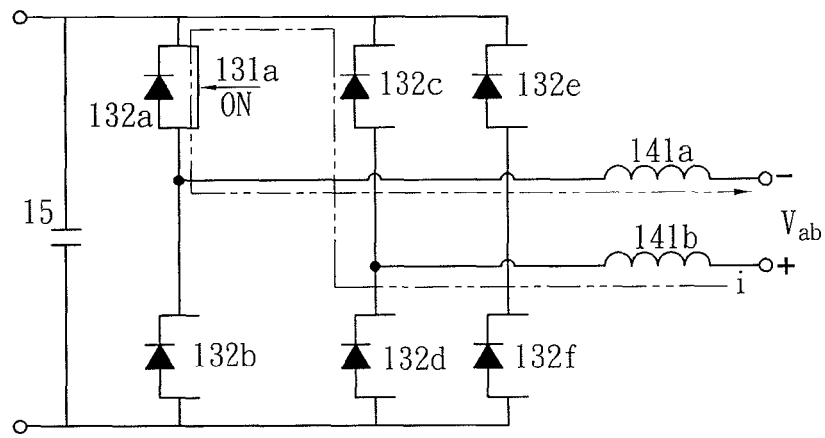

In addition, as shown in FIGS. 7A and 7B of this embodiment, when the first signal S1 is in the duration from 240° to 300°, the line voltage $V_{ab}$ has the voltage peak value (as shown in the zone E) higher than the line voltage $V_{bc}$ and the line voltage $V_{ca}$. The control signal generating circuit 12 can output the control signal CS when the line voltage $V_{ab}$ has the peak value and when the first signal S1 is in the duration from 240° to 300°, so as to control the switching element 131a to switch and make the power conversion apparatus 1 have the high conversion efficiency.

Figure 7C:
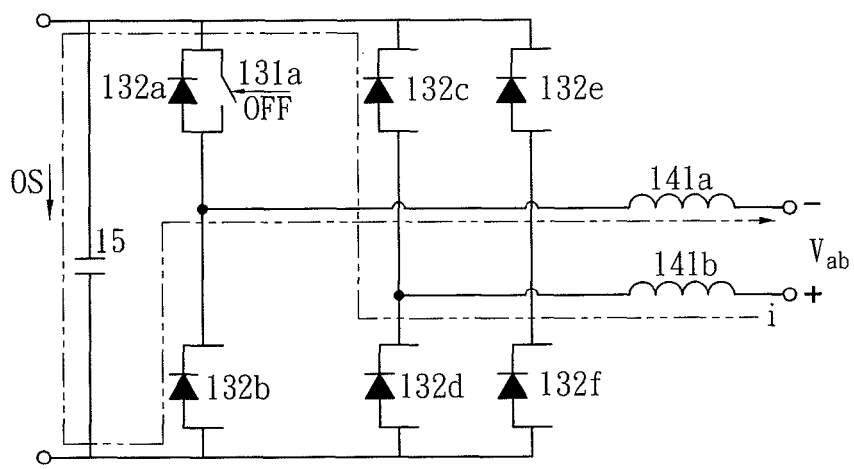

As shown in FIG. 7B, the control signal CS (not shown) only turns on the switching element 131a and generates the loop of the current i via the inductor 141b, the diode 132c, the switching element 131a and the inductor 141a according to the line voltage $V_{ab}$, so that the inductors 141a and 141b can store the electric power of the line voltage $V_{ab}$. In addition, as shown in FIG. 7C, the control signal CS (not shown) is again utilized to control the switching element 131a to turn off, and the electric power stored in the inductors 141a and 141b can be converted and outputted to the second energy storage unit 15 for storage through the loop of the current i via the inductor 141b, the diode 132c, the diode 132b and the inductor 141a.

Figure 8A:
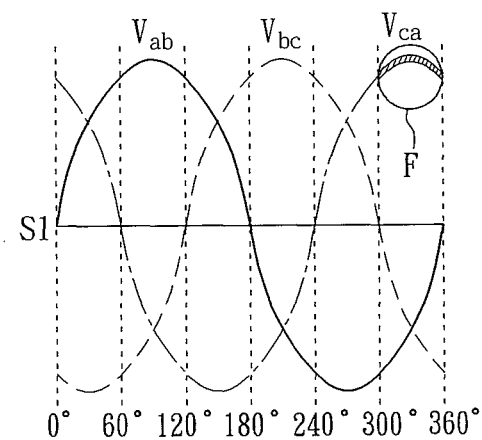
Figure 8B:
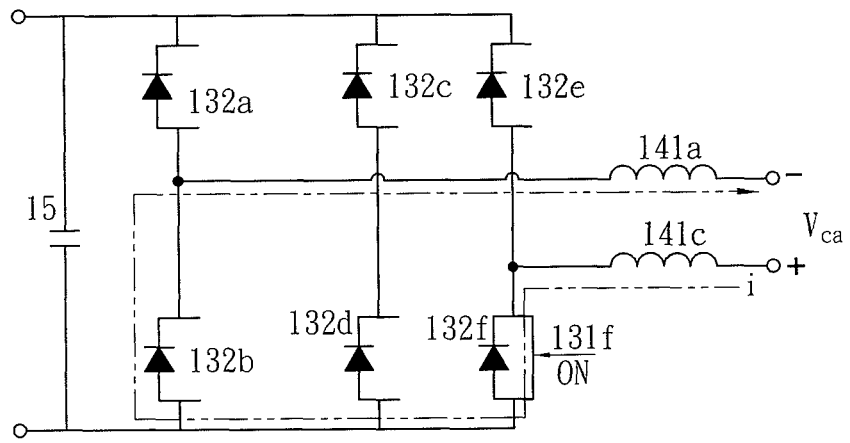

In addition, as shown in FIGS. 8A and 8B of this embodiment, when the first signal S1 is in the duration from 300° to 360° (or 0°), the line voltage $V_{ca}$ has the voltage peak value (as shown in the zone F) higher than the line voltage $V_{bc}$ and the line voltage $V_{ab}$. The control signal generating circuit 12 can output the control signal CS when the line voltage $V_{ca}$ has the peak value and when the first signal S1 is in the duration from 300° to 360°, so as to control the switching element 131f to switch and make the power conversion apparatus 1 have the high conversion efficiency.

Figure 8C:
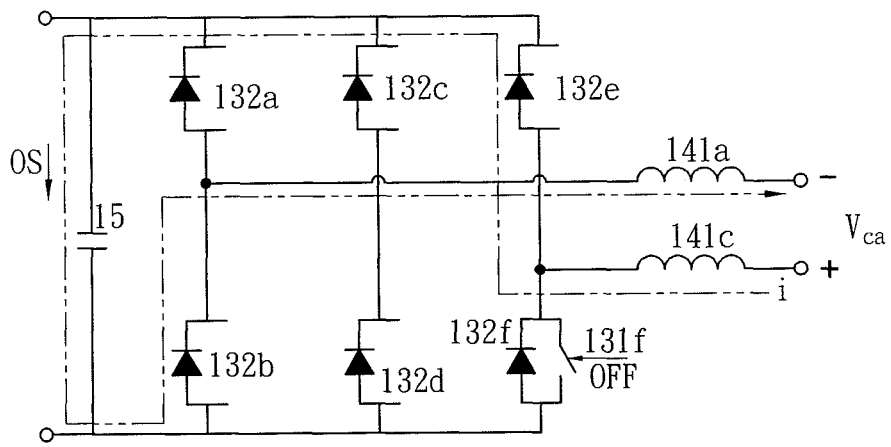

As shown in FIG. 8B, the control signal CS (not shown) only turns on the switching element 131f and generates the loop of the current i via the inductor 141c, the switching element 131f, the diode 132b and the inductor 141a according to the line voltage $V_{ca}$, so that the inductors 141a and 141c can store the electric power of the line voltage $V_{ca}$. In addition, as shown in FIG. 8C, the control signal CS (not shown) is again utilized to control the switching element 131f to turn off, and the electric power stored in the inductors 141a and 141c can be converted and outputted to the second energy storage unit 15 for storage through the loop of the current i via the inductor 141c, the diode 132e, the diode 132b and the inductor 141a.

As mentioned hereinabove, the power generation apparatus G of the invention can convert the first signal S1 into the second signal S2 via the conversion-sensing circuit 11 upon the low power output, and sense at least one voltage waveform change of the second signal S2 to generate the time interval, so as to obtain the instantaneous rotating speed and the frequency of the power generation apparatus G and make the power conversion apparatus 1 achieve the control of the instantaneous rotating speed. Not only the prior art position detector (the price of the position detector is high) is needed, but the power of the position detector needs not to be provided and the long distance line loss is eliminated. In addition, the control signal generating circuit 12 is further utilized to output the control signal CS according to the time interval, so as to control one of the switching elements of the switching circuit 13 to turn on and off via the SVPWM or the SPWM. Because only the on/off operation of one switching element is switched in one duration, the switch power consumption of the power transistor can be reduced, and the current harmonic wave of the output signal OS can be minimized, so that the power conversion apparatus 1 has the high efficiency energy conversion upon the low power output of the power generation apparatus G. In addition, upon the high power output of the power generation apparatus G, the power conversion apparatus 1 can simultaneously switch the operations of six switching elements 131a to 131f via the SVPWM or the SPWM, so that the output electric power of the power generation apparatus G can be converted. Similarly, the control signal CS of the SVPWM or the SPWM can also be generated by the conversion-sensing circuit 11 via the control signal generating circuit 12. Therefore, the power conversion apparatus 1 of the invention has the advantages of the full power and high efficiency energy conversion as well as the lower power loss.

Figure 9:
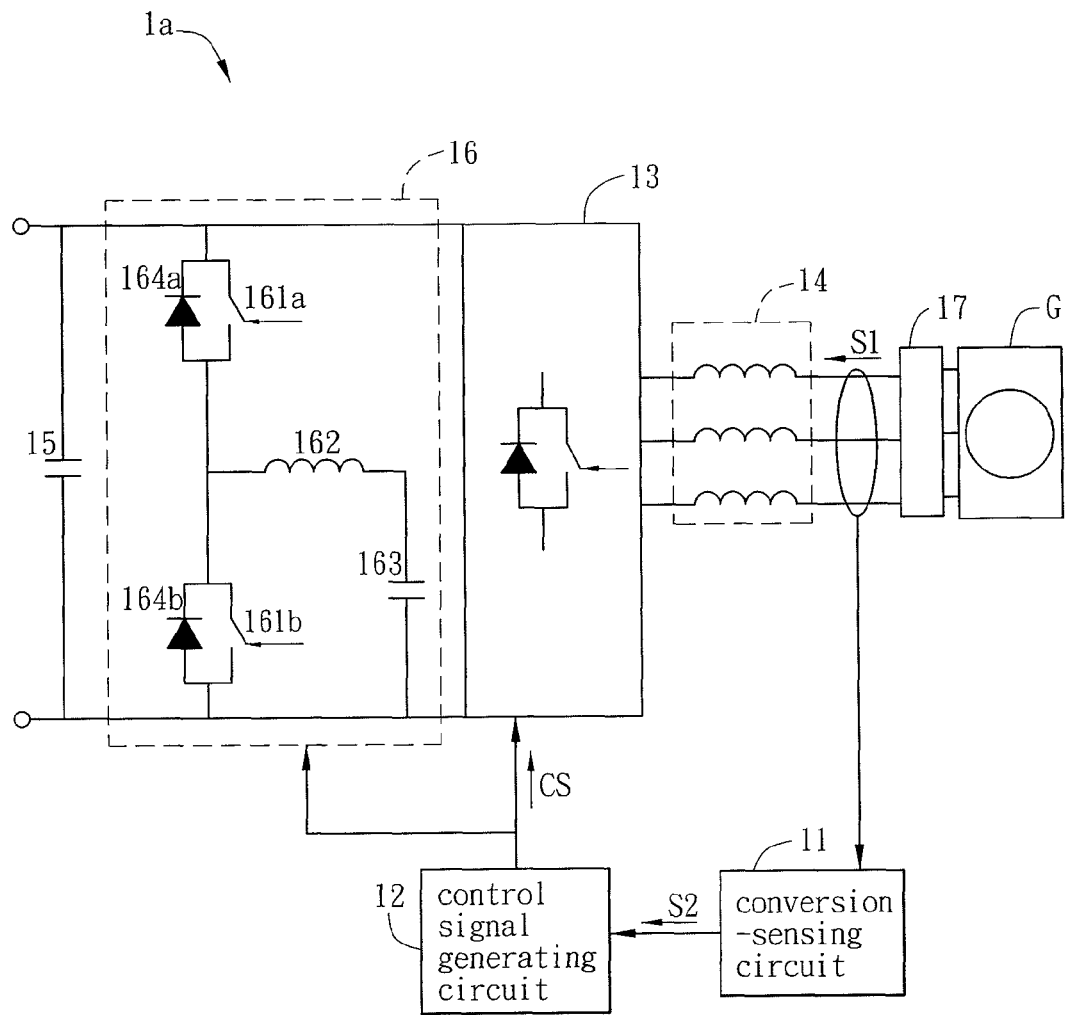
FIG. 9 is a schematic illustration showing a power conversion apparatus according to another preferred embodiment of the invention.

In addition, please refer to FIG. 9, which is a schematic illustration showing a power conversion apparatus 1a according to another preferred embodiment of the invention.

What is mainly different from the power conversion apparatus 1 of the FIG. 1 is that the power conversion apparatus 1a may further include a brake energy recovery circuit 16 electrically connected with the switching circuit 13 and the second energy storage unit 15. The brake energy recovery circuit 16 can recover the electric power generated when the power generation apparatus G is braking. When no wind or the breeze is present, the stored electric power controls the switching circuit 13 to operate through the control signal generating circuit 12 by way of the SVPWM or the SPWM, and the first energy storage unit 14 and the filter unit 17 filter out the noise signal and then release the energy to the power generation apparatus G to start the blades and to solve the problem of the starting inertia of the power generation apparatus G. Thus, it is possible to solve the problems, such as the overheating of the brake resistor, the too long starting time of the control device or the output module, the missed short energy receiving, the brake resistor loss caused by the incomplete starting of the output module, the long-term waste of the considerable energy and the like, encountered during the prior art electric power conversion processes.

The brake energy recovery circuit 16 has a switch unit, a first energy storage element 162 and a second energy storage element 163. In this embodiment, the switch unit may have a first switch element 161a and a second switch element 161b. In addition, the switch unit may further have two diodes 164a and 164b respectively connected in parallel to the first switch element 161a and the second switch element 161b. Herein, the diode 164a is connected in parallel to the first switch element 161a, and the diode 164b is connected in parallel to the second switch element 161b. In addition, the first switch element 161a, the diode 164a, the second switch element 161b and the diode 164b are electrically connected with the first terminal of the first energy storage element 162, the second terminal of the first energy storage element 162 is electrically connected with the first terminal of the second energy storage element 163, and the second terminal of the second energy storage element 163 is electrically connected with the second switch element 161b and the diode 164b. In this embodiment, the first energy storage element 162 is an inductor, and the second energy storage element 163 is a capacitor, and may be a super capacitor or any other elements capable of storing energy.

Please refer to FIGS. 10A to 10D, which are schematic illustrations showing operations of the brake energy recovery circuit 16 of FIG. 9, respectively, wherein the conversion-sensing circuit 11 and the control signal generating circuit 12 are not shown in FIGS. 10A to 10D. In addition, the switch elements of the switch unit, which do not operate, are also not shown. For example, the second switch element 161b is not shown in FIGS. 10A and 10B.

Figure 10A:
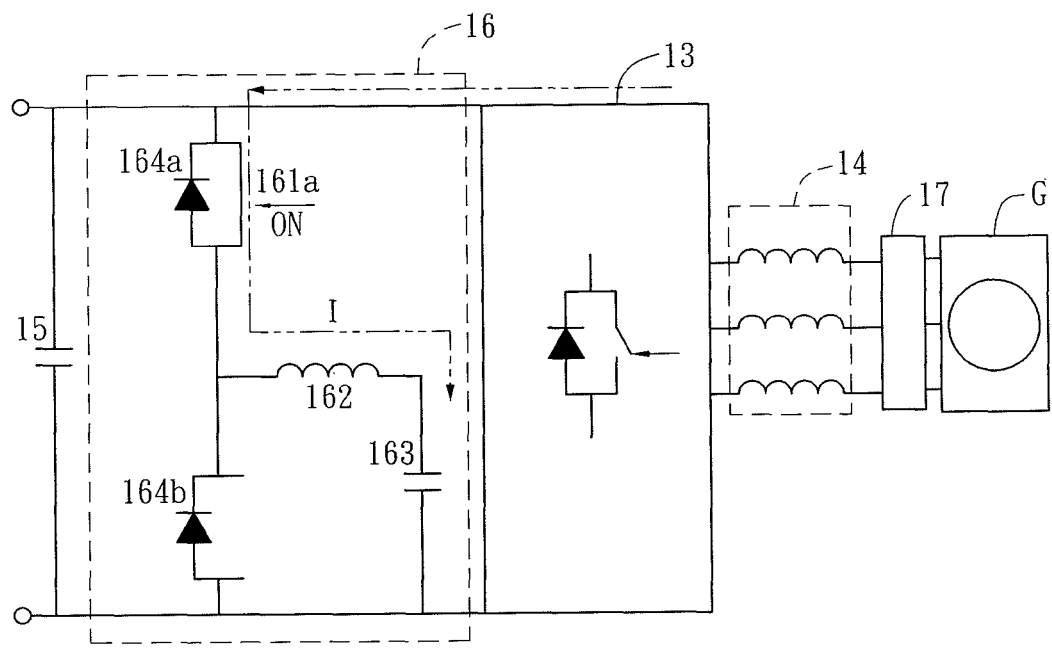
FIGS. 10A to 10D are schematic illustrations showing operations of the brake energy recovery circuit of FIG. 9, respectively.
Figure 10B:
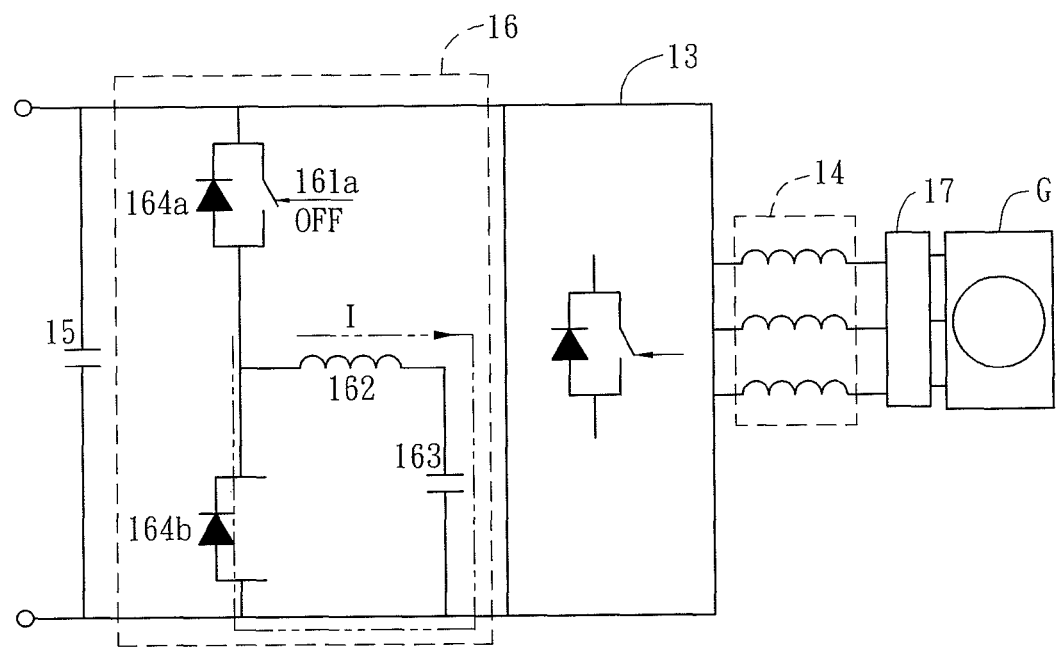

In this embodiment, as shown in FIG. 10A, when the power generation apparatus G is braking, the brake energy recovery circuit 16 can recover the electric power generated when the power generation apparatus G is braking. Herein, the control signal generating circuit 12 (not shown in FIG. 10A) can be utilized to control the first switch element 161a of the brake energy recovery circuit 16 to turn on by way of PWM, and the current 1 generated by the brake energy can be stored by the first energy storage element 162 (the inductor stores the energy) via the first switch element 161a. In addition, as shown in FIG. 10B, the control signal generating circuit 12 (not shown in FIG. 10B) is again utilized to control the first switch element 161a of the brake energy recovery circuit 16 to turn off by way of PWM, so that the energy stored in the first energy storage element 162 can be released and stored to the second energy storage element 163 (the inductor releases the energy).

Figure 10C:
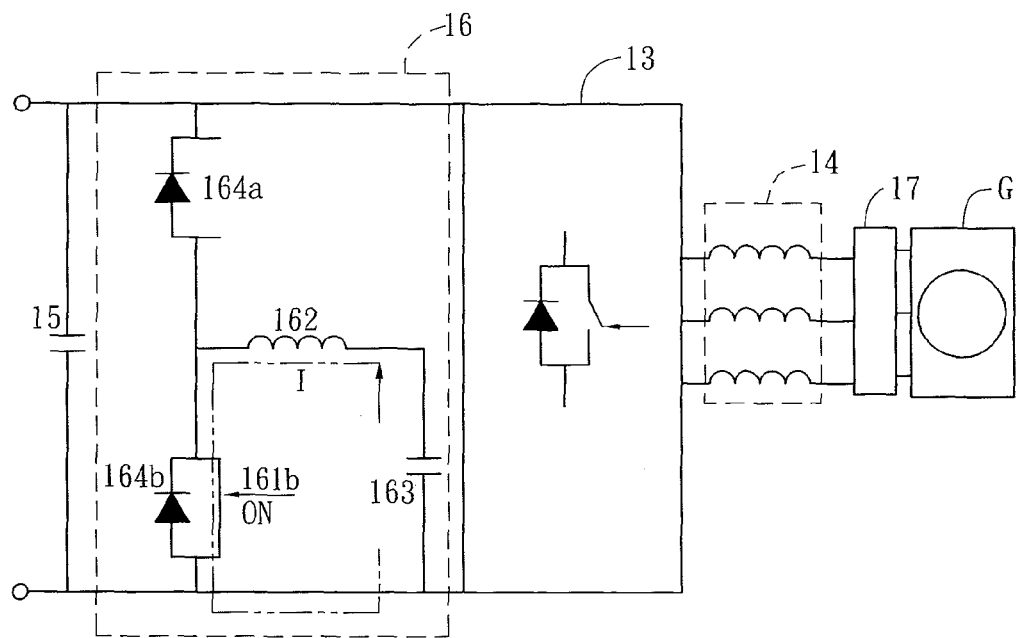
Figure 10D:
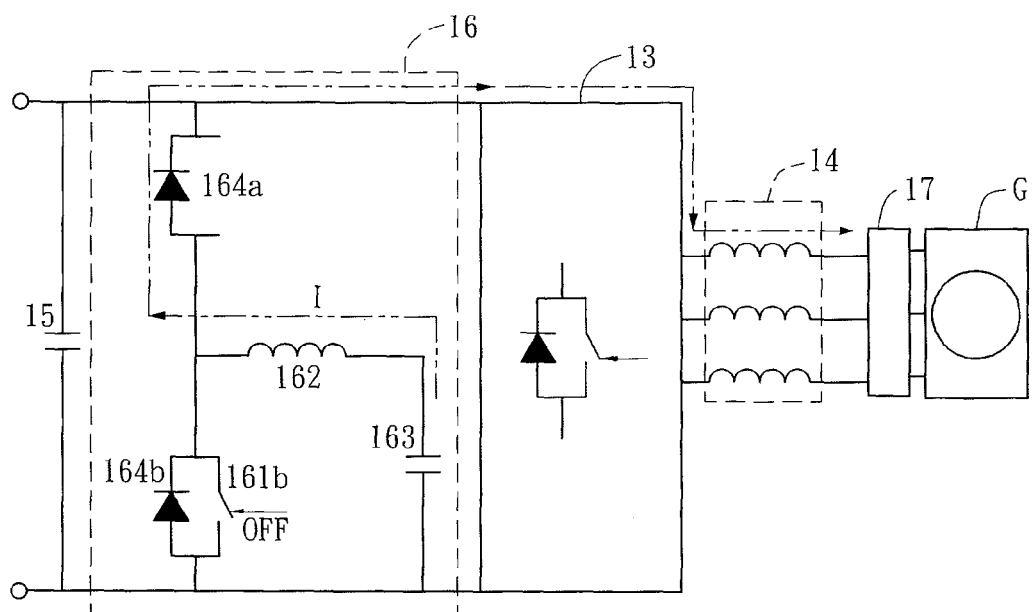

In addition, as shown in FIG. 10C, when the power generation apparatus G is to be started at no wind or at the breeze, the second switch element 161b can be controlled to turn on, and the second energy storage element 163 can release the stored electric power, which is received by the first energy storage element 162 (the inductor stores the energy). In addition, as shown in FIG. 10D, by controlling the second switch element 161b to turn off, the energy stored in the first energy storage element 162 can be released (the inductor releases the energy) to the second energy storage unit 15, and the power generation apparatus G can convert the reverse first signal S1, generated by the second energy storage unit 15, via the switching circuit 13, so that the power generation apparatus G becomes a motor to start the blades and solve the problem of the starting inertia of the power generation apparatus G. When no wind is present, this energy may also be released to any load electrically connected with the second energy storage unit 15. The signals for controlling the first switch element 161a and the second switch element 161b may be PWM signals, and may be generated by the control signal generating circuit 12 or another control circuit. Herein, the invention is not particularly restricted thereto.

In addition, the technological characteristics of the power conversion apparatus 1a can be obtained with reference to the power conversion apparatus 1, so detailed descriptions thereof will be omitted.

Figure 11:
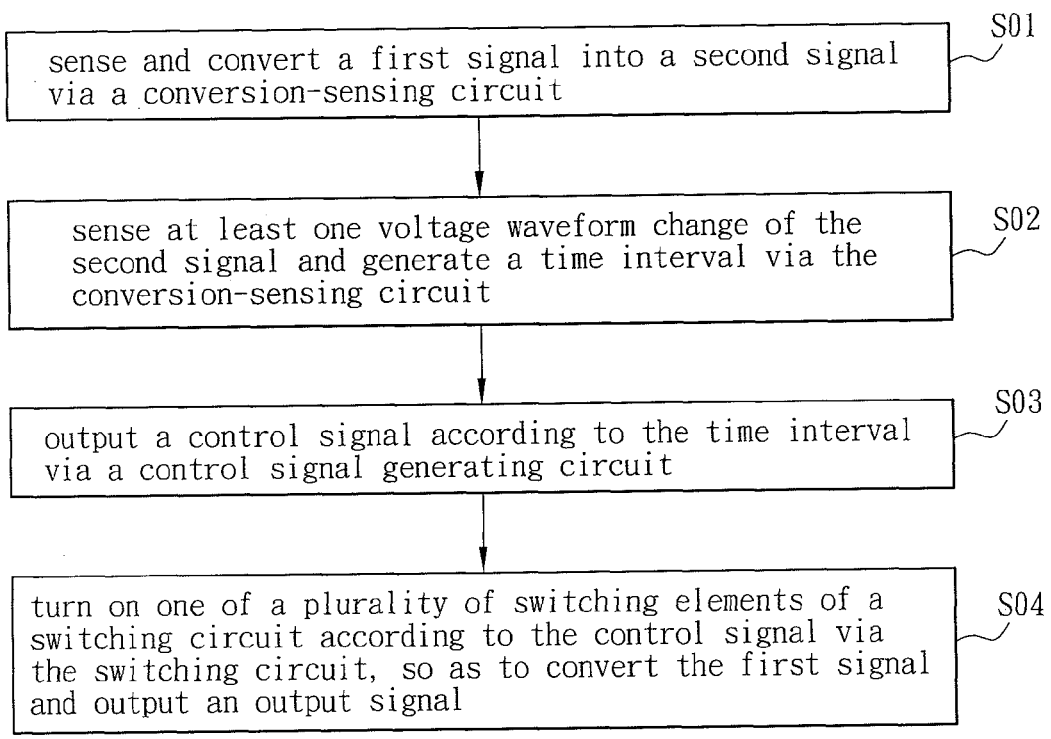
FIGS. 11 and 12 are schematic flow charts showing different controlling methods of the power conversion apparatus of the invention, respectively.

In addition, please refer to FIGS. 1 and 11 simultaneously, wherein FIG. 11 is a schematic flow chart showing a controlling method of the power conversion apparatus of the invention.

The controlling method of the invention is applied with the power conversion apparatus 1. The power conversion apparatus 1 includes a conversion-sensing circuit 11, a control signal generating circuit 12 and a switching circuit 13, wherein a power generation apparatus G outputs a first signal S1 inputted to the power conversion apparatus 1. The controlling method includes the following steps. In step S01, the conversion-sensing circuit 11 senses and converts the first signal S1 into a second signal S2. In step S02, the conversion-sensing circuit 11 senses at least one voltage waveform change of the second signal S2 and generates a time interval. In step S03, the control signal generating circuit 12 outputs a control signal CS according to the time interval. In step S04, the switching circuit 13 turns on one of a plurality of switching elements 131a to 131f of the switching circuit 13 according to the control signal CS, so as to convert the first signal S1 and output an output signal OS.

Figure 12:
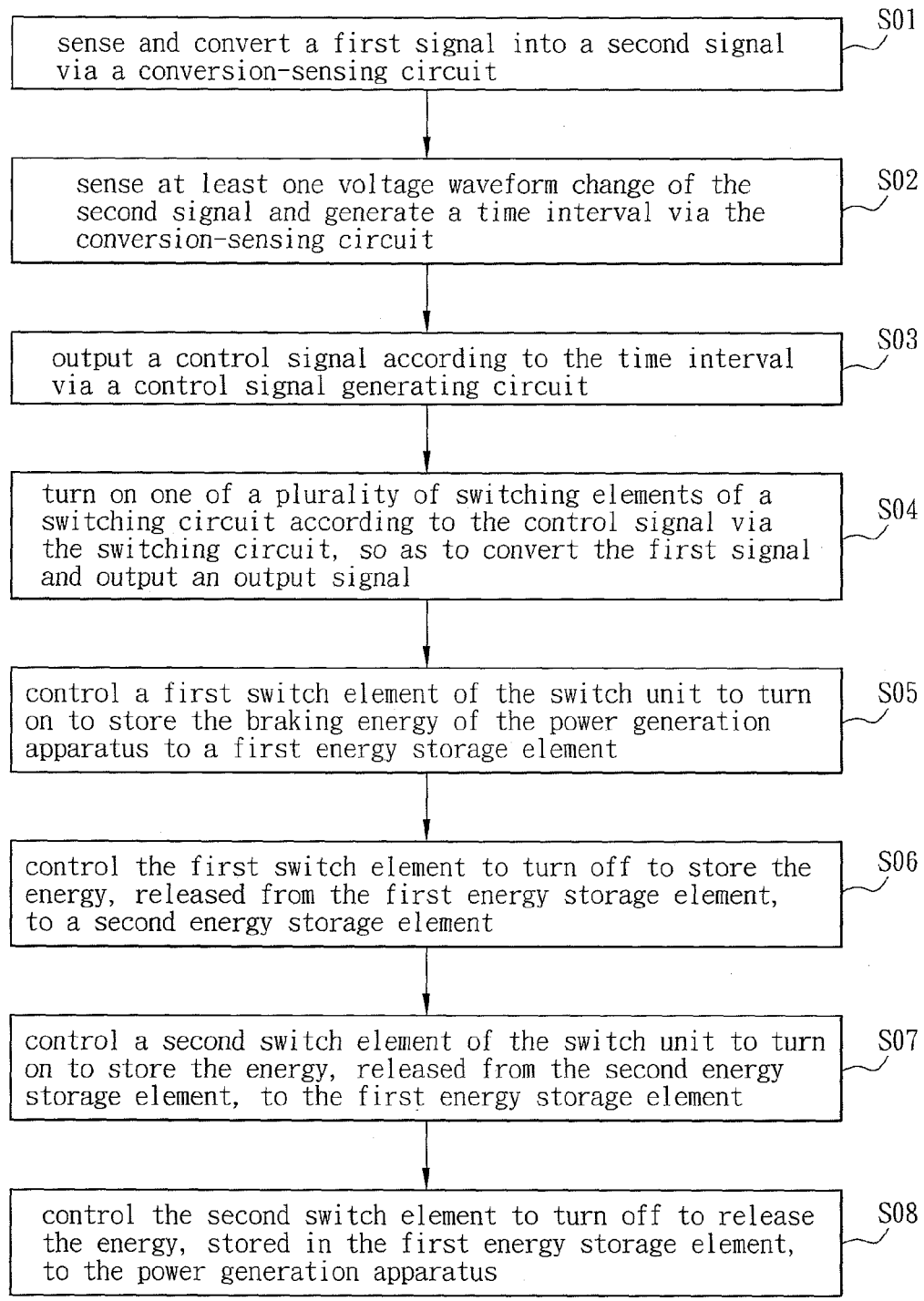

In addition, please refer to FIGS. 9 and 12 simultaneously, wherein FIG. 12 is a schematic flow chart showing another controlling method of the power conversion apparatus of the invention.

The controlling method of the invention may further include the following steps S05 and S06. In the step S05, a first switch element 161a of the switch unit is controlled to turn on, so as to store the braking energy of the power generation apparatus G to the first energy storage element 162. In the step S06, the first switch element 161a is controlled to turn off to store the energy, released from the first energy storage element 162, to the second energy storage element 163. In addition, the controlling method may further include the following steps S07 and S08. In the step S07, a second switch element 161b of the switch unit is controlled to turn on to store the energy, released from the second energy storage element 163, to the first energy storage element 162. In the step S08, the second switch element 161b is controlled to turn off to release the energy, released from the first energy storage element 162, to the power generation apparatus G.

In addition, the technological characteristics of the power conversion apparatus and the controlling method thereof have been described hereinabove, so detailed descriptions thereof will be omitted.

In summary, the power conversion apparatus of the invention utilizes the conversion-sensing circuit to convert the first signal into the second signal and to sense at least one voltage waveform change of the second signal to generate the time interval, so as to obtain the instantaneous rotating speed and the frequency of the power generation apparatus and achieve the control of the instantaneous rotating speed. Thus, the prior art position detector can be replaced, and it is unnecessary to provide the power for the position detector so that no long distance line loss occurs. In addition, the control signal generating circuit of the invention outputs the control signal according to the time interval so as to control one of the switching elements of the switching circuit to turn on and off, and the first signal is converted and outputted. Because only the switch operation of one switching element is switched in one duration, the power consumption of the switching element can be decreased, the current harmonic wave of the output signal can be minimized, and the power conversion apparatus has the full power and high efficiency energy conversion.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A power conversion apparatus applied with a power generation apparatus outputting a first signal, the power conversion apparatus comprising:
    a conversion-sensing circuit converting the first signal into a second signal and sensing at least one voltage waveform change of the second signal to generate a time interval;
    a control signal generating circuit, which is electrically connected with the conversion-sensing circuit and outputs a control signal according to the time interval; and
    a switching circuit, which is electrically connected with the power generation apparatus and the control signal generating circuit, and has a plurality of switching elements, wherein the switching circuit receives the first signal and turns on only one of the switching elements in a duration according to the control signal so as to convert the first signal and output an output signal,
    wherein the time interval is equal to one third of a time difference between a rising edge and a falling edge of a voltage waveform of the second signal, or the time interval is equal to a time difference between a rising edge of one of the voltage waveforms of the second signal and a falling edge of the other of the voltage waveforms of the second signal,
    wherein the control signal generating circuit controls the switching circuit by way of space vector pulse width modulation.

2. The power conversion apparatus according to claim 1, wherein the control signal generating circuit obtains a frequency of the first signal according to the time interval.

3. The power conversion apparatus according to claim 1, wherein the control signal generating circuit controls the switching circuit according to information of a corresponding voltage peak value of the first signal during a certain interval.

4. The power conversion apparatus according to claim 1, further comprising:
- a first energy storage unit electrically connected with the power generation apparatus and the switching circuit, wherein the first energy storage unit stores and releases electric power generated by the power generation apparatus according to turn-on and turn-off of the switching elements, respectively; and
- a second energy storage unit, which is electrically connected with the switching circuit and stores electric power of the output signal.

5. The power conversion apparatus according to claim 1, further comprising:
- a brake energy recovery circuit electrically connected with the switching circuit.

6. The power conversion apparatus according to claim 5, wherein the brake energy recovery circuit has a switch unit, a first energy storage element and a second energy storage element, the switch unit is electrically connected with a first terminal of the first energy storage element, and a second terminal of the first energy storage element is electrically connected with a first terminal of the second energy storage element.

7. The power conversion apparatus according to claim 6, wherein the switch unit has a first switch element electrically connected with the first terminal of the first energy storage element, the first energy storage element stores braking energy of the power generation apparatus when the first switch element turns on, and the second energy storage element stores energy released from the first energy storage element when the first switch element turns off.

8. The power conversion apparatus according to claim 7, wherein the switch unit further has a second switch element electrically connected with a first terminal of the first switch element and the first terminal of the first energy storage element, the first energy storage element stores energy released from the second energy storage element when the second switch element turns on, and the first energy storage element releases the stored energy to the power generation apparatus when the second switch element turns off.

9. A controlling method applied with a power conversion apparatus, which comprises a conversion-sensing circuit, a control signal generating circuit and a switching circuit, a power generation apparatus outputting a first signal inputted to the power conversion apparatus, the controlling method comprising:
- sensing the first signal and converting the first signal into a second signal via the conversion-sensing circuit;
- sensing at least one voltage waveform change of the second signal and generating a time interval via the conversion-sensing circuit;
- outputting a control signal via the control signal generating circuit and according to the time interval; and
- turning on only one of a plurality of switching elements of the switching circuit in a duration via the switching circuit and according to the control signal, and converting the first signal into an output signal and outputting the output signal, wherein the time interval is equal to one third of a time difference between a rising edge and a falling edge of a voltage waveform of the second signal, or the time interval is equal to a time difference between a rising edge of one of the voltage waveforms of the second signal and a falling edge of the other of the voltage waveforms of the second signal, wherein the control signal generating circuit controls the switching circuit by way of space vector pulse width modulation.

* * * * *